US008629879B2

(12) United States Patent
Low et al.

(10) Patent No.: US 8,629,879 B2
(45) Date of Patent: Jan. 14, 2014

(54) ELECTROPHORETIC DISPLAY CONTROLLER PROVIDING PIP AND CURSOR SUPPORT

(75) Inventors: Yun Shon Low, Richmond (CA); Eric Jeffrey, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 1271 days.

(21) Appl. No.: 12/429,582

(22) Filed: Apr. 24, 2009

(65) Prior Publication Data

US 2010/0271377 A1 Oct. 28, 2010

(51) Int. Cl.
*G06F 13/00* (2006.01)

(52) U.S. Cl.
USPC .......... 345/536; 345/530; 345/537; 345/538; 345/539

(58) Field of Classification Search
USPC ................................................ 345/536, 107
See application file for complete search history.

(56) References Cited

U.S. PATENT DOCUMENTS

| | | | | |
|---|---|---|---|---|
| 5,444,457 A | 8/1995 | Hotto | | |
| 5,627,558 A | 5/1997 | Hotto | | |
| 5,831,588 A | 11/1998 | Hotto | | |
| 5,883,610 A * | 3/1999 | Jeon | | 345/629 |
| 7,027,061 B1 | 4/2006 | Dotson et al. | | |
| 2006/0044328 A1 * | 3/2006 | Rai et al. | | 345/629 |
| 2007/0126693 A1 * | 6/2007 | Johnson et al. | | 345/107 |
| 2009/0179923 A1 * | 7/2009 | Amundson et al. | | 345/690 |

FOREIGN PATENT DOCUMENTS

| | | |
|---|---|---|
| CN | 1882977 A | 12/2006 |
| WO | 2005050610 A1 | 6/2005 |

* cited by examiner

*Primary Examiner* — Ke Xiao
*Assistant Examiner* — Kim-Thanh T Tran

(57) ABSTRACT

Data pixels defining first and second images are stored in first and second image buffers, respectively. A second image coordinate location within a display matrix of a display device having display pixels that have multiple stable states is stored in a memory. Data pixels of the first image are read from the first image buffer. If a data pixel read from the first image buffer is within the second image coordinate location, a data pixel from the second image buffer corresponding with the data pixel read from the first image buffer is read, and the data pixel read from the second image buffer is combined with the corresponding data pixel read from the first image buffer to generate a derived data pixel. Synthesized pixels corresponding with at least each of the data pixels of the second image are generated. The synthesized pixels respectively include the derived data pixels.

20 Claims, 9 Drawing Sheets

ELECTROPHORETIC DISPLAY CONTROLLER PROVIDING PIP AND CURSOR SUPPORT

TECHNICAL FIELD

This application relates to driving or updating active-matrix, electro-optic display devices with display pixels having multiple stable display states.

BACKGROUND

An electro-optic material has at least two "display states," the states differing in at least one optical property. An electro-optic material may be changed from one state to another by applying an electric field across the material. The optical property may or may not be perceptible to the human eye, and may include optical transmission, reflectance, or luminescence. For example, the optical property may be a perceptible color or shade of gray.

Electro-optic displays include the rotating bichromal member, electrochromic medium, electro-wetting, and particle-based electrophoretic types. Electrophoretic display ("EPD") devices, sometimes referred to as "electronic paper" devices, may employ one of several different types of electro-optic technologies. Particle-based electrophoretic media include a fluid, which may be either a liquid, or a gaseous fluid. Various types of particle-based EPD devices include those using encapsulated electrophoretic, polymer-dispersed electrophoretic, and microcellular media. Another electro-optic display type similar to EPDs is the dielectrophoretic display.

Generally, an image is formed on an electro-optic display device by individually controlling the display states of a large number of small individual picture elements or display pixels. A data pixel having one or more bits defines a particular display state of a display pixel. A frame of data pixels defines an image. Commonly, the display pixels are arranged in rows and columns forming a display matrix. An exemplary electro-optic display pixel includes a layer of electro-optic material situated between a common electrode and a pixel electrode. One of the electrodes, typically the common electrode, may be transparent. The common and pixel electrodes together form a parallel plate capacitor at each display pixel, and when a potential difference exists between the electrodes, the electro-optic material situated in between the electrodes experiences the resulting electric field.

An active-matrix display includes at least one non-linear circuit element, such as a transistor, for each display pixel. An exemplary active-matrix display pixel includes a thin-film transistor having its drain terminal coupled with the pixel electrode. The gate and source terminals of the transistor are respectively coupled with a row select line and a column data line. To change the display state of the display pixel, the common electrode is placed at ground or some other suitable voltage and a row driver circuit turns on the transistor by driving a suitable voltage on the row select line. An optical-property-dependent voltage corresponding with a display state transition may then be driven on the column data line by a column driver circuit.

An electro-optic display device may have display pixels that have multiple stable display states. Display devices in this category are capable of displaying (a) multiple display states, and (b) the display states are considered stable. With respect to (a), display devices having multiple stable display states include electro-optic displays that may be referred to in the art as "bistable." The display pixels of a bistable display have first and second stable display states. The first and second display states differ in at least one optical property, such as a perceptible color or shade of gray. For example, in the first display state, the display pixel may appear black and in the second display state, the display pixel may appear white. In addition, display devices having multiple stable display states include devices having display pixels that have three or more stable display states. Each of the multiple display states differ in at least one optical property, e.g., light, medium, and dark shades of a particular color. As another example, a display device having multiple stable states may have display pixels having display states corresponding with 4, 8, 16, 32, or 64 different shades of gray.

With respect to (b), the multiple display states of a display device may be considered to be stable, according to one definition, if the persistence of the display state with respect to display pixel drive time is sufficiently large. The display state of a display pixel may be changed by driving a drive pulse (typically a voltage pulse) on the column data line of the display pixel until the desired appearance is obtained. Alternatively, the display state of a display pixel may be changed by driving the column data line over time with a series of drive pulses regularly spaced in time. In either case, the display pixel exhibits a new display state at the conclusion of the drive time. If the new display state persists for at least several times the minimum duration of the drive time, the new display state may be considered stable. Generally, in the art, the display states of display pixels of LCDs and CRTs are not considered to be stable.

EPD devices may be used in many different applications. For example, EPD devices may be used in electronic readers, cellular telephones, digital photo frames, and commercial signage. In various applications, the EPD device may be used to render a main image. Considering the example of the electronic reader, the main image may be a welcome screen, a page of a book, newspaper, magazine, or other document. In addition, the EPD device may be used to render an "overlay image." The overlay image may be, for example, a pop-up menu, dialog box, icon, cursor, battery charge level indicator, message indicator, text, or other type of graphical image. The sub-windows may appear to overlay the main image being rendered. The location and size of the overlay image on the display may vary. During a session of use, a variety of different main and overlay image may be rendered at different times.

The display state of an EPD display pixel may be changed by applying one or more drive pulses. The drive pulse(s) required to change the display state of an EPD display pixel may depend on the prior display state of the display pixel, as well as other factors, which presents novel problems when rendering overlay images on an EPD device.

Accordingly, there is a need for methods and apparatus for efficient rendering of overlay images in an EPD device.

SUMMARY OF DISCLOSURE

According to one embodiment, a method includes storing data pixels defining a first image in a first image buffer, and storing data pixels defining a second image in a second image buffer. In addition, the method includes storing a coordinate location of the second image in a memory, The coordinate location may define a first display location in a display matrix of a display device having display pixels, the display pixels having multiple stable states. Further, the method includes reading the data pixels of the first image from the first image buffer. If the coordinate location of a data pixel read from the first image buffer is within the first display location, the method includes reading a data pixel from the second image buffer corresponding with the data pixel read from the first image buffer, and combining the data pixel read from the second image buffer with the corresponding data pixel read from the first image buffer to generate a derived data pixel. Synthesized pixels corresponding with at least each of the data pixels of the second image are generated. The synthesized pixels respectively include the derived data pixels.

According to one embodiment, a display controller includes a first memory and a second memory. The first memory includes a first image buffer to store data pixels defining a first image and a second image buffer to store data pixels defining a second image. The second memory serves to store a coordinate location of the second image. The coordinate location of the second image defines a first display location in a display matrix of a display device having display pixels, the display pixels having multiple stable states. In addition, the display controller includes a first unit. The first unit reads data pixels of the first image from the first image buffer, and if the coordinate location of a data pixel read from the first image buffer is within the first display location, reads a data pixel from the second image buffer corresponding with the data pixel read from the first image buffer, and combines the data pixel read from the second image buffer with the corresponding data pixel read from the first image buffer to generate a derived data pixel. Further, the first unit generates synthesized pixels corresponding with at least each of the data pixels of the second image, the synthesized pixels respectively including the derived data pixels.

DETAILED DESCRIPTION

In the following detailed description of exemplary embodiments, reference is made to the accompanying drawings, which form a part hereof. In the several figures, like referenced numerals identify like elements. The detailed description and the drawings illustrate exemplary embodiments. Other embodiments may be utilized, and other changes may be made, without departing from the spirit or scope of the subject matter presented here. The following detailed description is therefore not to be taken in a limiting sense, and the scope of the claimed subject matter is defined by the appended claims.

The display state of a display pixel may be changed by applying one or more drive pulses. The drive pulse(s) required to change the display state of a display pixel depends on the prior display state of the display pixel, as well as other factors, which presents novel problems when rendering overlay images on an EPD device. When display pixels of an overlay image are rendered instead of display pixels of the main image on an EPD device, it necessary to determine the prior display state in order to select the correct drive pulse(s), the prior display state being the display state of the main image pixel. In addition, when an overlay image is moved from one location to another, the display pixels that were formerly hidden by the overlay image need to be driven to a new display state. It is again necessary to know the prior display state of the display pixels in order to select the correct drive pulse(s). The need to know prior display states is a problem not solved in known display controllers that support overlay images. Accordingly, there is a need for methods and apparatus for efficient rendering of overlay images in an EPD device.

Figure 1:
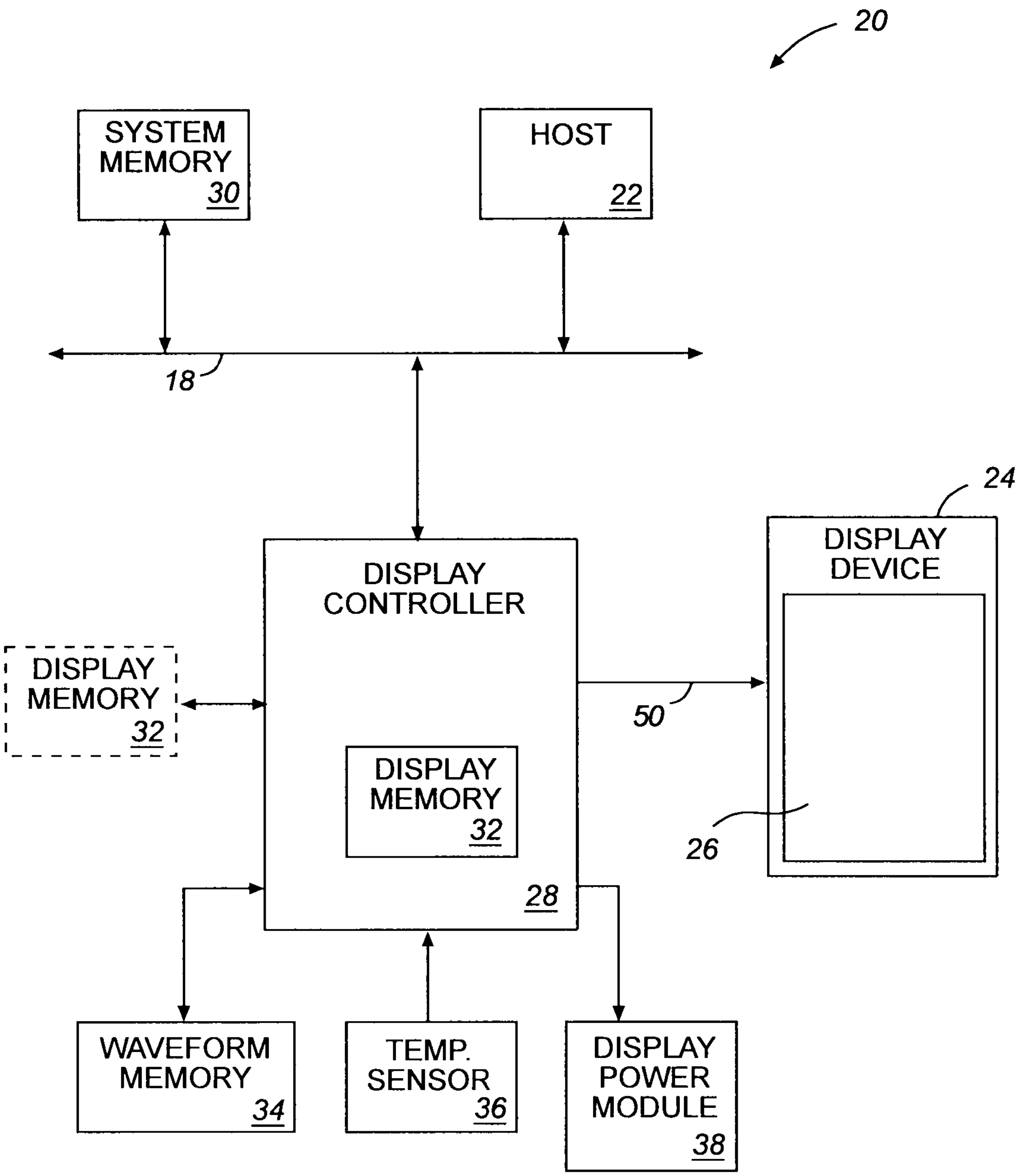
FIG. 1 is a block diagram of a display system having a display device and a display controller having a display memory according to one embodiment.

FIG. 1 illustrates a block diagram of an exemplary display system 20 illustrating one context in which embodiments may be implemented. The system 20 includes a host 22, a display device 24 having a display matrix 26, a display controller 28, and a system memory 30. The system 20 also includes a display memory 32, a waveform memory 34, a temperature sensor 36, and a display power module 38. In addition, the system 20 includes a first bus 18, a bus 50, as well as the shown buses interconnecting system components. The system 20 may be any digital system or appliance. In one embodiment, the system 20 is a battery powered (not shown) portable appliance, such as an electronic reader, cellular telephone, digital photo frame, or display sign. FIG. 1 shows only those aspects of the system 20 believed to be helpful for understanding the disclosed embodiments, numerous other aspects having been omitted.

The host 22 may be a general purpose microprocessor, digital signal processor, controller, computer, or any other type of device, circuit, or logic that executes instructions of any computer-readable type to perform operations. Any type of device that can function as a host or master is contemplated as being within the scope of the embodiments.

In one embodiment, the display device 24 may be an electro-optic display device with display pixels having multiple stable display states in which individual display pixels may be driven from a current display state to a new display state by series of two or more drive pulses. In one alternative, the display device 24 may be an electro-optic display device with display pixels having multiple stable display states in which individual display pixels may be driven from a current display state to a new display state by a single drive pulse. The display device 24 may be an active-matrix display device. In one embodiment, the display device 24 may be an active-matrix, particle-based electrophoretic display device having display pixels that includes one or more types of electrically-charged particles suspended in a fluid, the optical appearance of the display pixels being changeable by applying an electric field across the display pixel causing particle movement through the fluid.

In one embodiment, the display controller 28 may be disposed on an integrated circuit ("IC") separate from other elements of the system 20. In an alternative embodiment, the display controller 28 need not be embodied in a separate IC.

In one embodiment, the display controller 28 may be integrated into one or more other elements of the system 20. The display controller 28 is further described below.

The system memory 30 may be may be an SRAM, VRAM, SGRAM, DDRDRAM, SDRAM, DRAM, flash, hard disk, or any other suitable memory. The system memory may store instructions that the host 22 may read and execute to perform operations. The system memory may also store data or instructions.

The display memory 32 may be an SRAM, VRAM, SGRAM, DDRDRAM, SDRAM, DRAM, flash, hard disk, or any other suitable memory. The display memory 32 may be a separate memory unit (shown in dashed lines), such as a separate IC, or it may be a memory embedded in the display controller 28, as shown in FIG. 1. The display memory 32 may be employed to store one frame of pixel data and one frame of synthesized pixel data. The display memory may also store data or instructions.

The waveform memory 34 may be a flash memory, EPROM, EEPROM, or any other suitable non-volatile memory. The waveform memory 34 may store one or more different drive schemes, each drive scheme including one or more waveforms used for driving a display pixel to a new display state. The waveform memory 34 may include a different set of waveforms for one or more update modes. The waveform memory 34 may include waveforms suitable for use at one or more temperatures. The waveform memory 34 may be coupled with the display controller 28 via a serial or parallel bus. The waveform memory may also store data or instructions.

The drive pulse (or more typically, the series of drive pulses) required to change the display state of a display pixel to a new display state depends on temperature and other factors. To determine temperature, the temperature sensor 36 is provided. The temperature sensor 36 may be a digital temperature sensor with an integrated Sigma Delta analog-to-digital converter or any other suitable digital temperature sensor. In one embodiment, the temperature sensor 36 includes an $I^2C$ interface and is coupled with the display controller 28 via the $I^2C$ interface. The temperature sensor 36 may be mounted in a location suitable for obtaining temperature measurements that approximate the actual temperatures of the display pixels of the display device 24. The temperature sensor 36 may be coupled with the display controller 28 in order to provide temperature data that may be used in selecting a display pixel drive scheme.

The power module 38 is coupled with the display controller 28 and the display device 24. The power management unit 38 may be a separate IC. The power module 38 receives control signals from the display controller 28 and generates drive pulses of appropriate voltage (or current) to drive selected display pixels of the display device. In one embodiment, the power management unit 38 may generate voltages of +15V, −15V, or 0V. When drive pulses are not needed, the power module 38 may be powered down or placed in a standby mode.

Figure 2:
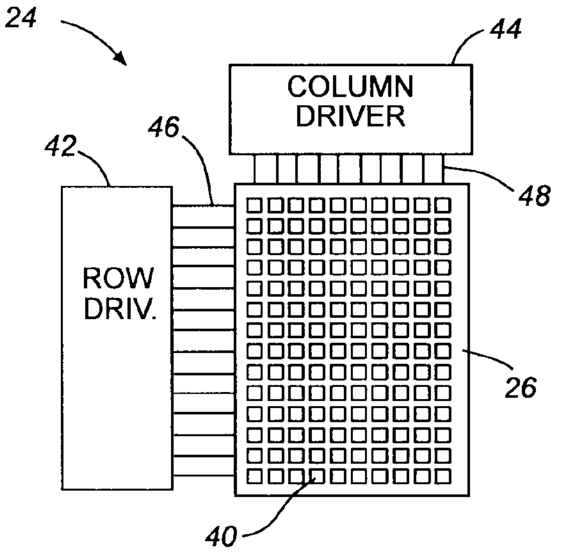
FIG. 2 is a schematic view of the display device of FIG. 1, the display device having a display matrix.

FIG. 2 shows a schematic view of the display device 24. An image may be formed on the display device 24 by individually controlling the display states of a large number of small individual picture elements ("display pixels") 40. The display device 24 includes a display matrix 26 of display pixels 40. In one embodiment, each display pixel 40 includes an active switching element (not shown in FIG. 2), such as a thin-film transistor. The switching elements are selected and driven by row driver 42 and a column driver 44. In operation, the row driver 42 may select one of the row select lines 46, turning on all of the switching elements in the row. The column driver 44 may provide a drive pulse on one or more selected column data lines 48, thereby providing a drive pulse to the display pixel located at the intersection of selected row and column lines.

The display device 24 may be coupled with the display controller 28 via one or more buses 50 that the display controller uses to provide pixel data and control signals to the display. The display state of a display pixel 40 is defined by one or more bits of data, which may be referred to as a "data pixel." An image is defined by data pixels and may be referred to as a "frame." Commonly, the display pixels are arranged in rows and columns forming a matrix ("display matrix") 26. There is a one-to-one correspondence between data pixels of a frame and the display pixels 40 of a corresponding display matrix 26.

Figure 3:
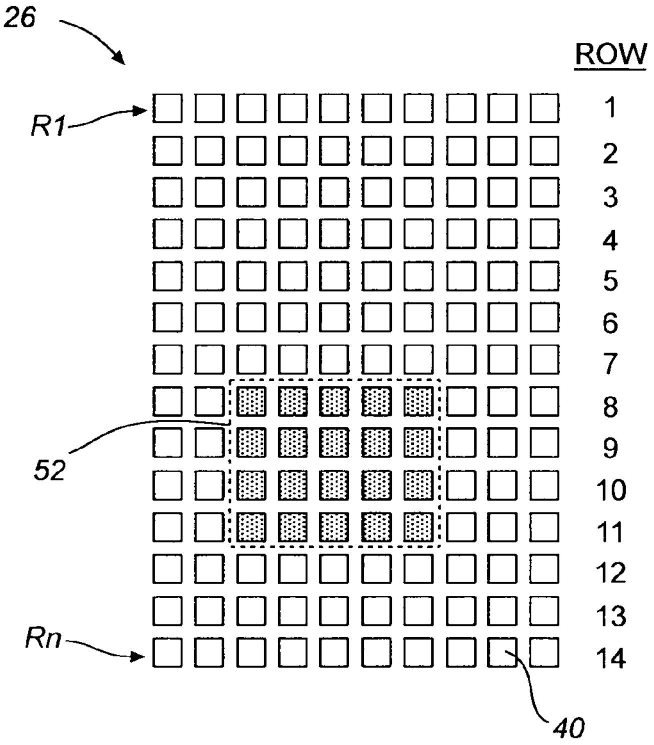
FIG. 3 is a schematic view of the exemplary display matrix of FIG. 2, the display matrix having display pixels.

FIG. 3 shows a schematic view of an exemplary display matrix 26 of display pixels 40. The display device 24 includes a display matrix 26 of display pixels 40 for displaying a frame of pixel data. The display matrix 26 may include any number of rows and columns of display pixels. As one example, the display matrix includes 480 rows and 640 columns. The display matrix 26 includes a first row R1. The display matrix 26 may include one or more submatrices 52. The display submatrix 52 may be used in this description to refer to a region of the display matrix 26 that is an overlay window. In alternative embodiments, the display submatrix 52 may define a pop-up menu, dialog box, cursor, icon, battery charge level indicator, message indicator, text, or any other type of graphical image. The location or size of a submatrix, or both, may vary with time. The values of the data pixels defining a submatrix may also vary from time to time. More than one display submatrix 52 may displayed at the same time.

The display pixels 40 of the display matrix 26 of the display device 24 may have multiple stable states. In one embodiment, the display device 24 is a display device having display pixels 40 having three or more stable display states, each display state differing in at least one optical property. In one alternative embodiment, the display device 24 is a bistable display device having display pixels 40 which have first and second stable display states, each state differing from the other in at least one optical property. The display state of a display pixel 40 may be persistent with respect to drive time. In one embodiment, the display state of a display pixel 40 persists for at least two or three times the minimum duration of the drive time. In addition, in one embodiment, the drive pulse required to change the display state of a display pixel 40 from a current display state to a new display state strongly depends on the current display state.

In one embodiment, the display device 24 includes a layer of electro-optic material situated between a common electrode and a pixel electrode. One of the electrodes, typically the common electrode, may be transparent. The common and pixel electrodes together form a parallel plate capacitor, and when a potential difference exists between the electrodes, the electro-optic material situated in between the electrodes experiences the resulting electric field. This general arrangement may be in the form of one parallel plate capacitor at each display pixel, or more than one parallel plate capacitor at each display pixel.

Figure 4:
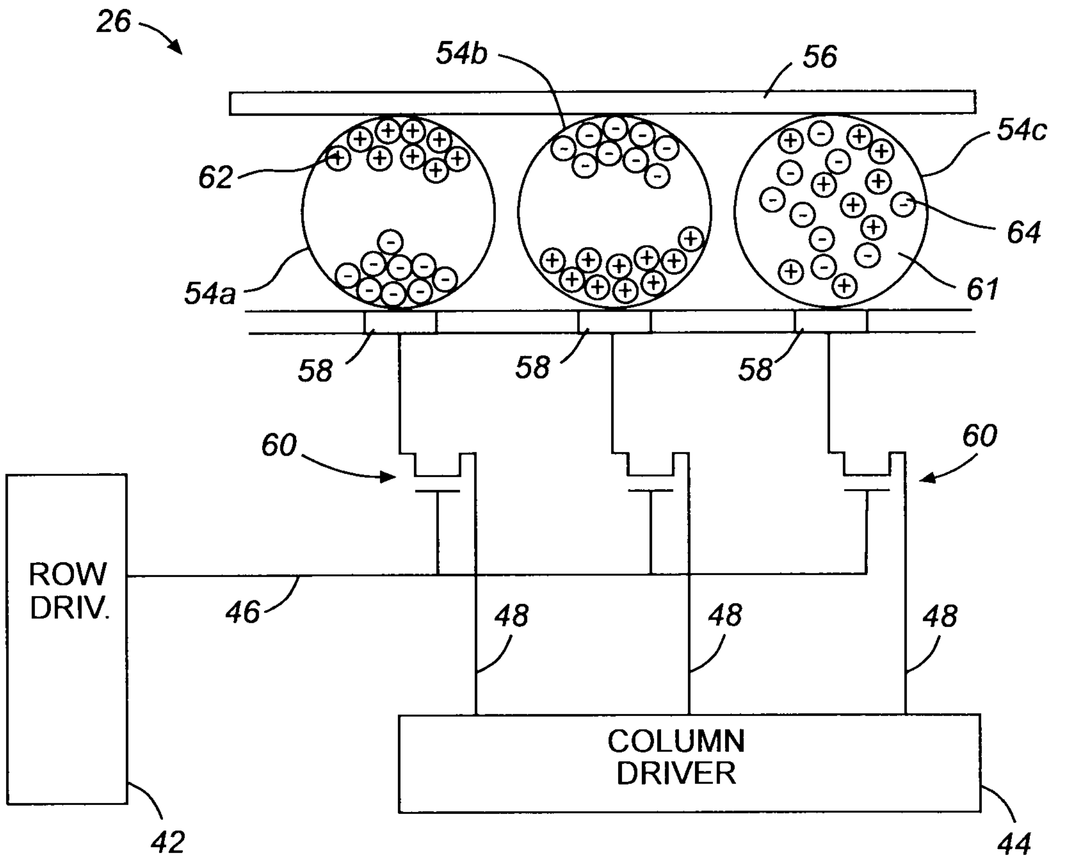
FIG. 4 is a diagram illustrating electrophoretic media disposed between electrodes in an active-matrix arrangement forming one or more display pixels.

FIG. 4 is a diagram illustrating one exemplary arrangement of one type of electrophoretic media disposed between a common electrode and a pixel electrode, one type of nonlinear circuit element of an active-matrix, and row and column driving circuits. FIG. 4 includes a simplified representation of a portion of the exemplary electrophoretic display 26 in cross-section, a schematic diagram of a portion of the associated nonlinear circuit elements, and a block diagram of row and column driving circuits 42, 44. Referring to FIG. 4, one or more microcapsules 54 are sandwiched between common electrode 56 and pixel electrode 58. The common electrode 56 may be transparent. The drain terminal of a thin-film transistor 60 is coupled with the pixel electrode 58. The gate terminals of the thin-film transistors 60 are coupled with the row driver 42 via row select line 46. The source terminal of each thin-film transistor 60 is coupled with column driver 44 via the column data line 48. Each display pixel may correspond with one microcapsule 54 as shown in FIG. 4, or may correspond with two or more microcapsules (not shown). Each microcapsule 54 may include positively charged white particles 62 and negatively charged black particles 64 suspended in a fluid 61.

To change the display state of a display pixel 40, the common electrode 56 is placed at ground or some other suitable voltage and the row driver circuit 42 turns on all of the transistors 60 in one of the rows by driving a suitable voltage on the row select line 46. The column driver circuit 44 then drives a drive pulse on the column data lines 48 of data pixels having their display state changed. As charge builds up on the common and pixel electrodes 56, 58 an electric field is established across the microcapsule(s) 54 associated with a particular display pixel. When the electric field is positive, the white particles 62 move toward the electrode 56, which results in the display pixel becoming whiter in appearance. On the other hand, when the electric field is negative, the black particles 64 move toward the electrode 56, which results in the display pixel becoming blacker in appearance. The microcapsule 54*a* is a simplified representation of a display pixel that is completely white and the microcapsule 54*b* is a simplified representation of a display pixel that is completely black. In addition, the microcapsule 54*c* illustrates a display pixel having a gray-scale value other than completely white or black, i.e., gray.

So long as charge is stored on the common and pixel electrodes 56, 58 there will be an electric field across the display pixel causing particle movement through the fluid. It will be appreciated that even after the row driver circuit 42 turns a transistor 60 off, or the column driver circuit 44 stops driving a drive pulse on the column data line 48, charge may remain on the common and pixel electrodes 56, 58, i.e., the field does not instantly collapse. In addition, particles 62, 64 may have momentum. Accordingly, particle movement through the fluid may continue for some time after a display pixel has been driven.

While the display state of a display pixel may be changed by having the column driver apply and hold an appropriate drive pulse on the column data line 48 until the desired display state is obtained in a single time interval, alternative methods may be employed for changing the display state of a display pixel. Various alternative methods provide for driving a series of drive pulses over time. In these methods, the display matrix 26 is refreshed or updated in a series of two or more "drive frames." For each drive frame in the series, each row is selected once, allowing the column driver 44 to drive a drive pulse onto each display pixel of the selected row having its display state changed. The duration of time that each row is selected may be identical so that each drive frame in the series is of identical duration. Thus, instead of changing the display state of a display pixel with a single drive pulse in a single time period, the display state may be changed by driving a series of drive pulses in a series of time periods regularly spaced in time.

Figure 5:
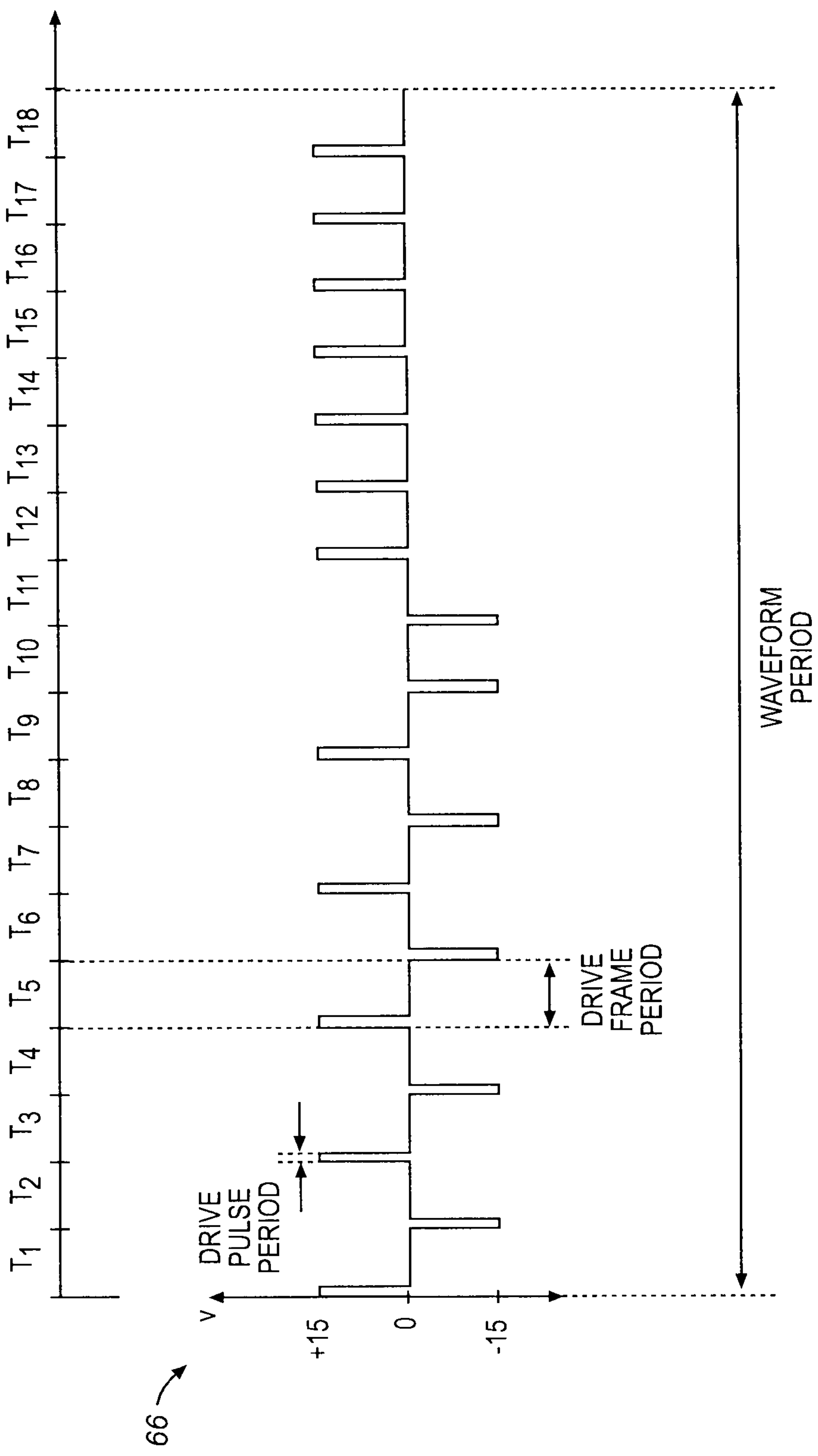
FIG. 5 is a timing diagram of an exemplary waveform used to effect a display state transition of a display pixel.

FIG. 5 shows an exemplary waveform 66. The term "waveform" may be used in this description to denote the entire series of drive pulses occurring in a series of time periods regularly spaced in time that are used to cause a transition from some initial display state to a final display state. A waveform may include one or more "pulses" or "drive pulses," where a pulse or a drive pulse generally refers to the integral of voltage with respect to time, but may refer to the integral of current with respect to time. The term "drive scheme" may be used in this description to refer to a set of waveforms sufficient to effect all possible transitions between display states for a specific display device under particular environmental conditions.

The waveform 66 is provided for the purpose of illustrating features of waveforms generally and for defining terms. The waveform 66 is not intended to depict an actual waveform. The time periods shown in FIG. 5 are not intended to be to scale. The time period in which a single drive pulse is driven may be referred to as the "drive pulse period." In one embodiment, the drive pulse periods are of identical duration. The time period in which all of the lines of a display matrix 26 are addressed once may be referred to as the "drive frame period." In one embodiment, each drive frame period is of identical duration. The time associated with the entire series of drive frame periods may be referred to as the "waveform period." The "drive time" of a display pixel 40 may be equal to a waveform period.

The display device 24 may make use of multiple drive schemes. For example, the display device 24 may use a gray scale drive scheme ("GSDS"), which can be used to cause transitions between all possible gray levels. In addition, display device 24 may use a monochrome drive scheme ("MDS"), which can be used to cause transitions only between two gray levels, e.g., black or white. Further, the display device 24 may use a pen update mode (PU), which can be used to cause transitions having an initial state that includes all possible gray levels and a final state of either black or white. The MDS and PU drive schemes typically provide quicker rewriting of the display than the GSDS drive scheme. A drive scheme may be selected based on the type of display state transitions that are needed. For instance, if display pixels may take any one of 16 gray levels and the region being updated includes display pixels transitioning from 10 to 15, then the GSDS drive scheme must be used. However, if the region being updated includes display pixels transitioning from 10 to 0, or 10 to 15, then either the GSDS or PU drive schemes may be used. Because the PU drive scheme is faster than the GSDS drive scheme, the PU drive scheme would generally be used. In alternative embodiments, any number of display states may be provided, e.g., 2, 4, 8, 32, 64, 256, etc.

Figure 6:
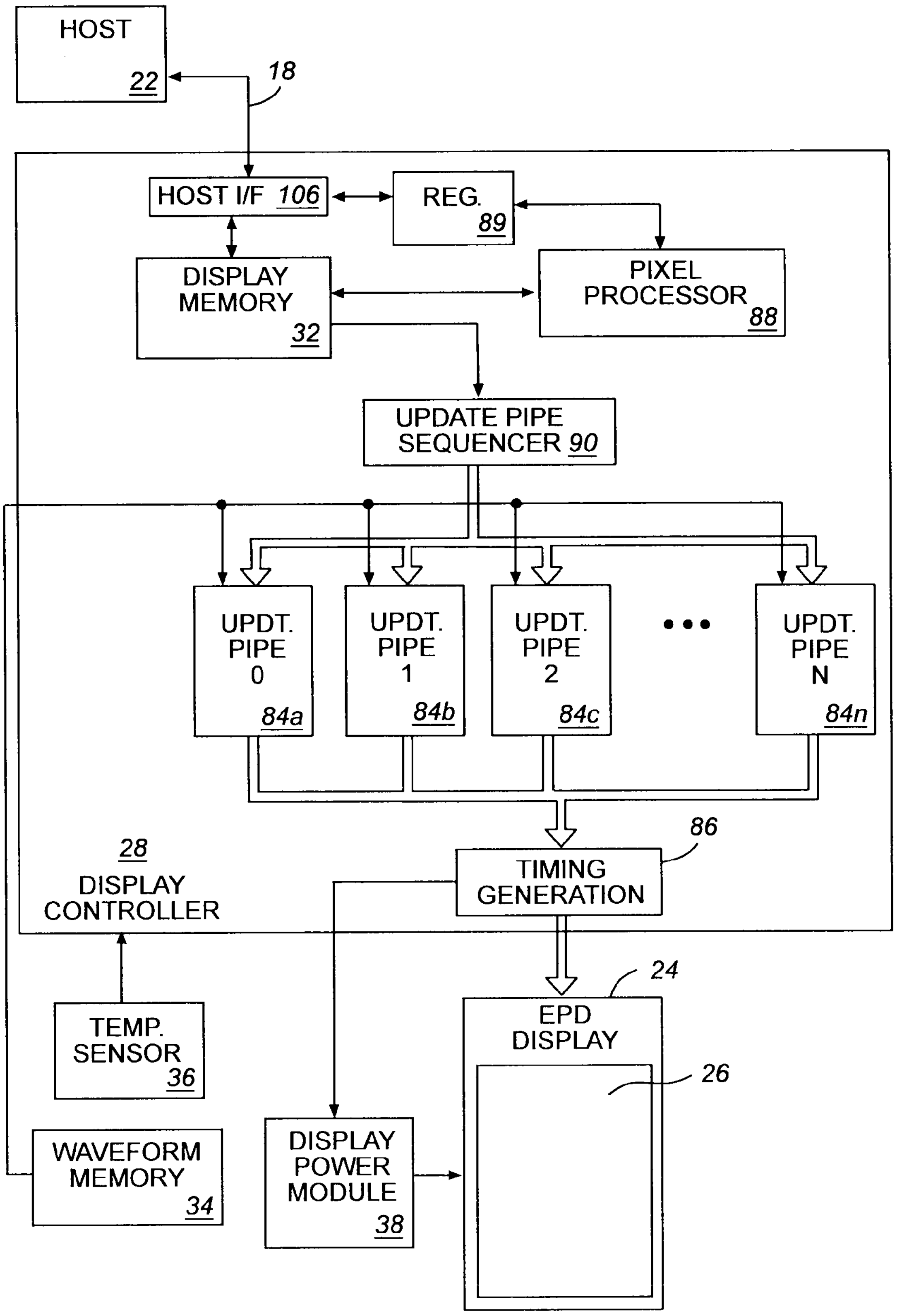
FIG. 6 is a block diagram of the display controller of FIG. 1 according to one embodiment.

FIG. 6 shows the display controller 28 of FIG. 1, according to one embodiment, in greater detail. The display controller 28 may include the display memory 32, one or more update pipes 84, a timing generation unit 86, a pixel processor 88, one or more registers 89, an update pipe sequencer 90, and a host interface 106. The display memory 32 may be coupled with the host 22 via the host interface 106. In addition, the display memory 32 may be coupled with pixel processor 88, and the update pipe sequencer 90. The registers 89 may be coupled with the host 22 via the host interface 106 and the update pipe sequencer 90.

Use of the display controller 28 permits the image displayed on an electro-optic display device having multiple stable display states to be divided into two or more regions and each of the regions may be updated in separate display update operations. Each display update operation may use a different drive scheme or update mode, and the display update operations may overlap in time. Each display update operation may use a different update pipe 84. The updating of a first region of the display matrix using a first update mode can begin even while a display update operation for updating a second region using a second update mode is in progress.

Figure 7:
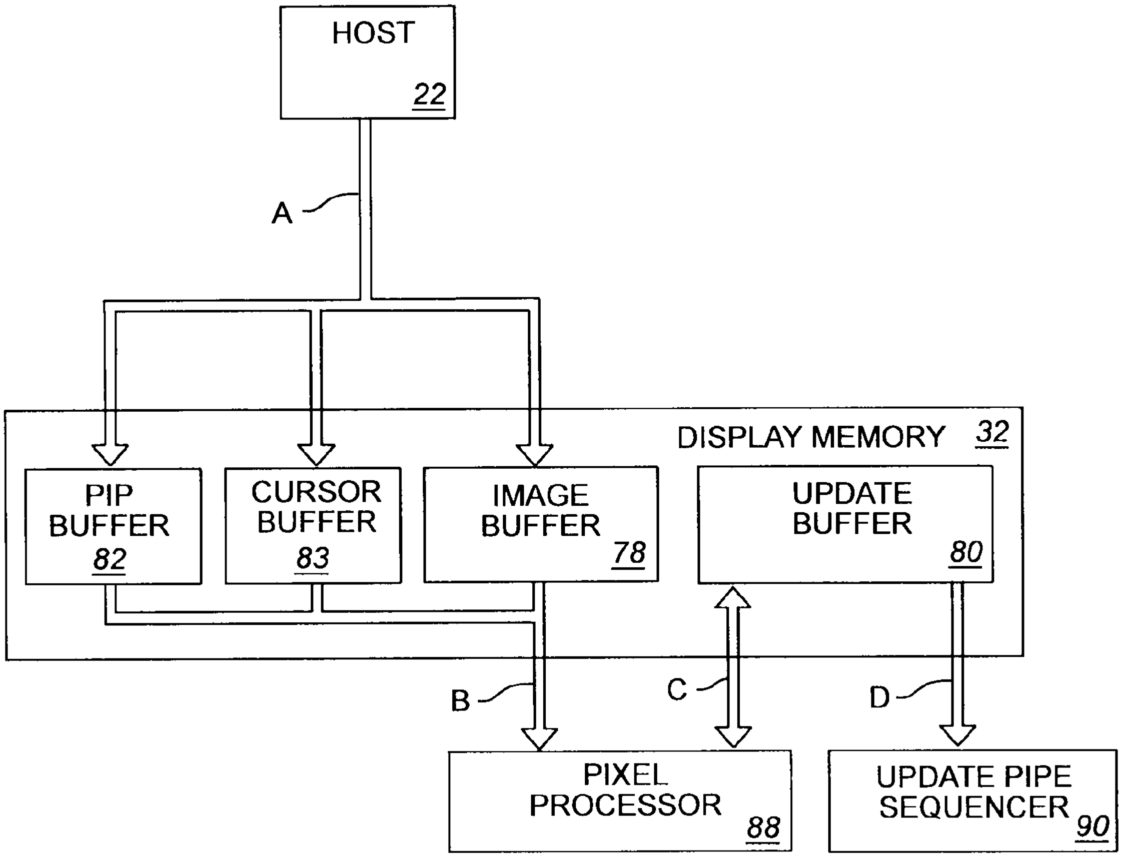
FIG. 7 is a block diagram showing the display memory of FIG. 1 and exemplary data paths according to one embodiment.

FIG. 7 is a block diagram showing the display memory 32, according to one embodiment, in greater detail, and exemplary data paths between the display memory 32 and the host 22, the pixel processor 88, and update pipe sequencer 90. In one embodiment, the display memory 32 includes an image buffer 78 and an update buffer 80. In addition, the display memory 32 may include at least one PIP (picture-in-picture) buffer 82, and at least one cursor ("CSR") buffer 83. The host 22 may write to the image buffer 78, PIP buffer 82, and cursor buffer 83 via data path "A." (Although not shown in FIG. 7, the host 22 may also read from the display memory 32.) In a pixel synthesis operation, the pixel processor 88 may read from the image buffer 78, PIP buffer 82, and cursor buffer 83 via data path "B." In addition, the pixel processor 88 may read from and write to the update buffer 80 via data path "C." In a display update operation, the update pipe sequencer 90 may read from the update buffer 80 via data path "D."

The image buffer 78 may be used to store a frame of data pixels, e.g., a main image. The PIP buffer 82 may be used to store a first overlay image and the cursor buffer 83 may also be used to store a second overlay image. The update buffer 80 may be used to store synthesized pixels. In one embodiment, a "synthesized pixel" is a data structure or a data record that defines a pixel transition. A synthesized pixel may include data defining a current display state and a next display state. A synthesized pixel may additionally include an identifier of an assigned update pipe 84.

The host 22 may store a full frame of data pixels or a portion of a frame of data pixels in the image buffer 78 using data path A. The pixel processor 88 may include an operability to generate synthesized pixels. In a pixel synthesis operation, the pixel processor 88 may read a data pixel stored in the image buffer 78, PIP buffer 82, and cursor buffer 83 to obtain data defining a next display state of a display pixel 40 using data path B. In one embodiment, the pixel processor 88 may read a synthesized pixel stored in the update buffer 80 to obtain data defining a current display state of a display pixel 40 using data path C. The pixel processor 88 may use the data pixel obtained from one of the image buffer 78, PIP buffer 82, and cursor buffer 83, and the synthesized pixel obtained from the update buffer 80 to generate a new synthesized pixel. The pixel processor 88 may store synthesized pixels that it generates in the update buffer 80 using data path C. The storing of a synthesized pixel in the update buffer 80 by the pixel processor 88 may overwrite a previously stored synthesized pixel.

Figure 8:
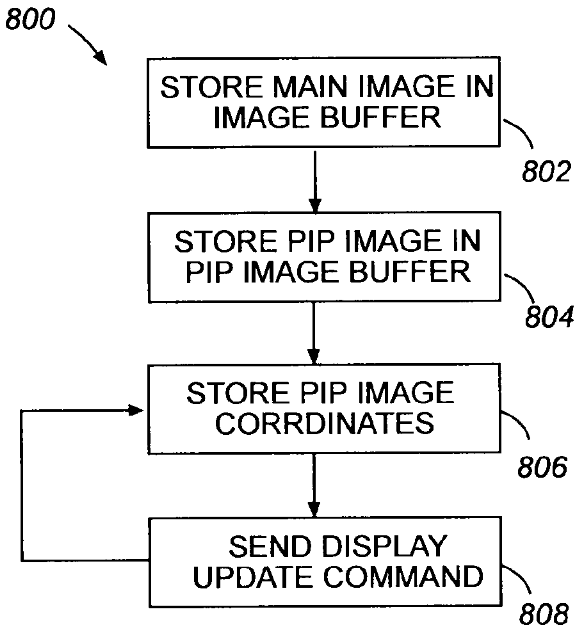
FIG. 8 is a flow diagram illustrating a display update operation according to one embodiment.

FIG. 8 is a flow diagram illustrating a display update operation 800 according to one embodiment. In an operation 802, data pixels 40 of a main image are stored in the image buffer 78. In one embodiment, the host 22 may store data pixels 40 of the main image in the image buffer 78 using data path A. In an alternative embodiment, another device or unit may store data pixels of a main image in image buffer 78. In an operation 804, data pixels 40 of a first overlay image are stored in the PIP buffer 82. In one embodiment, the host 22 may store data pixels 40 of the first overlay image using data path A. In an alternative embodiment, another device or unit may store data pixels of a first overlay image in PIP buffer 82. In an operation 806, coordinates for defining the location of the first overlay image in the display matrix 26 are stored in the registers 89. The location coordinates may be stored by the host 22 or by another device or unit. In an operation 808, a display update command is sent, transmitted, or communicated to the display controller 28. The display update command may be sent by the host 22 or by another device or unit. The display update command causes the display states of the display pixels 40 of the display matrix 26 to be updated. After the operations 802-808 have been completed, new coordinates for the first overlay image may be stored in the registers 89. In other words, the operation 806 may be repeated with coordinates for defining a second location of the first overlay image. Thereafter, the operation 808 may be repeated, the sending of the display update command causing an update of the display matrix 26. In the update resulting from sending a second or subsequent display update command, the first overlay image will be rendered at the second location.

In one embodiment, an imaging device, such as a camera, or an interface circuit, such as a pen input interface circuit, may store a first overlay image in the PIP buffer 82. The imaging device or interface circuit may also store coordinates for defining the location of the first overlay image in the registers 89. A circuit internal to the display controller, or the imaging device or interface circuit may send a display update command.

Figure 9:
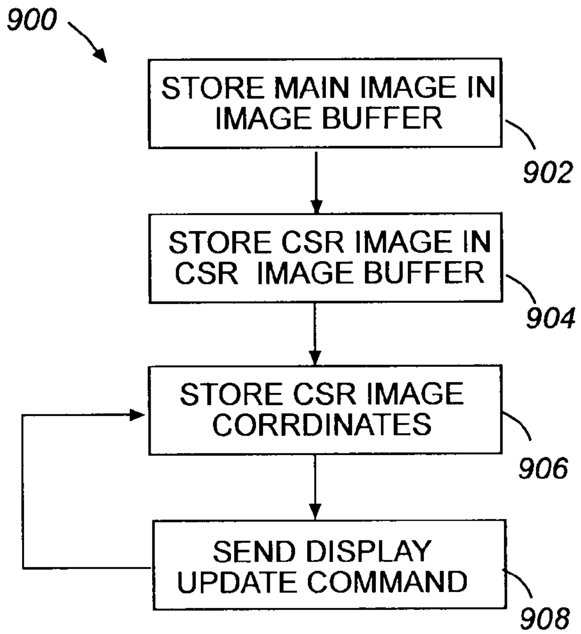
FIG. 9 is a flow diagram illustrating a display update operation according to one embodiment.

FIG. 9 is a flow diagram illustrating a display update operation 900 according to one embodiment. In an operation 902, data pixels 40 of a main image are stored in the image buffer 78. In one embodiment, the host 22 may store data pixels 40 of the main image in the image buffer 78 using data path A. In an alternative embodiment, another device or unit may store data pixels of a main image in image buffer 78. In an operation 904, data pixels 40 of a second overlay image are stored in the cursor buffer 83. In one embodiment, the host 22 may store data pixels 40 of the second overlay image using data path A. In an alternative embodiment, another device or unit may store data pixels of a second overlay image in cursor buffer 83. In an operation 906, coordinates for defining the location of the second overlay image in the display matrix 26 are stored in the registers 89. The location coordinates may be stored by the host 22 or by another device or unit. In an operation 908, a display update command is sent, transmitted, or communicated to the display controller 28. The display update command may be sent by the host 22 or by another device or unit. The display update command causes the display states of the display pixels 40 of the display matrix 26 to be updated. After the operations 902-908 have been completed, new coordinates for the second overlay image may be stored in the registers 89. In other words, the operation 906 may be repeated with coordinates for defining a second location of the second overlay image. Thereafter, the operation 908 may be repeated, the sending of the display update command causing an update of the display matrix 26. In the update resulting from sending a second or subsequent display update command, the second overlay image will be rendered at the second location.

In one embodiment, an interface circuit, such as a mouse or trackball input interface circuit, may store a second overlay image in the cursor buffer 92. The interface circuit may also store coordinates for defining the location of the second overlay image in the registers 89. A circuit internal to the display controller, or interface circuit may send a display update command.

FIGS. 8 and 9 are flow diagrams of display update operations 800, 900 illustrating how the display location of first and second overlay images may be changed by writing a new coordinate location into the registers 89 and sending a display update command to the display controller 28. In one embodiment, the display update operations 800, 900 may be combined into a single operation, e.g., store new coordinates in the registers 89 for the PIP and cursor overlay image and send a single display update command. The single display update command results in one display update operation for both the first and second overlay images. A display update operation may include: (a) a pixel synthesis operation; and (b) a display output operation.

Figure 10:
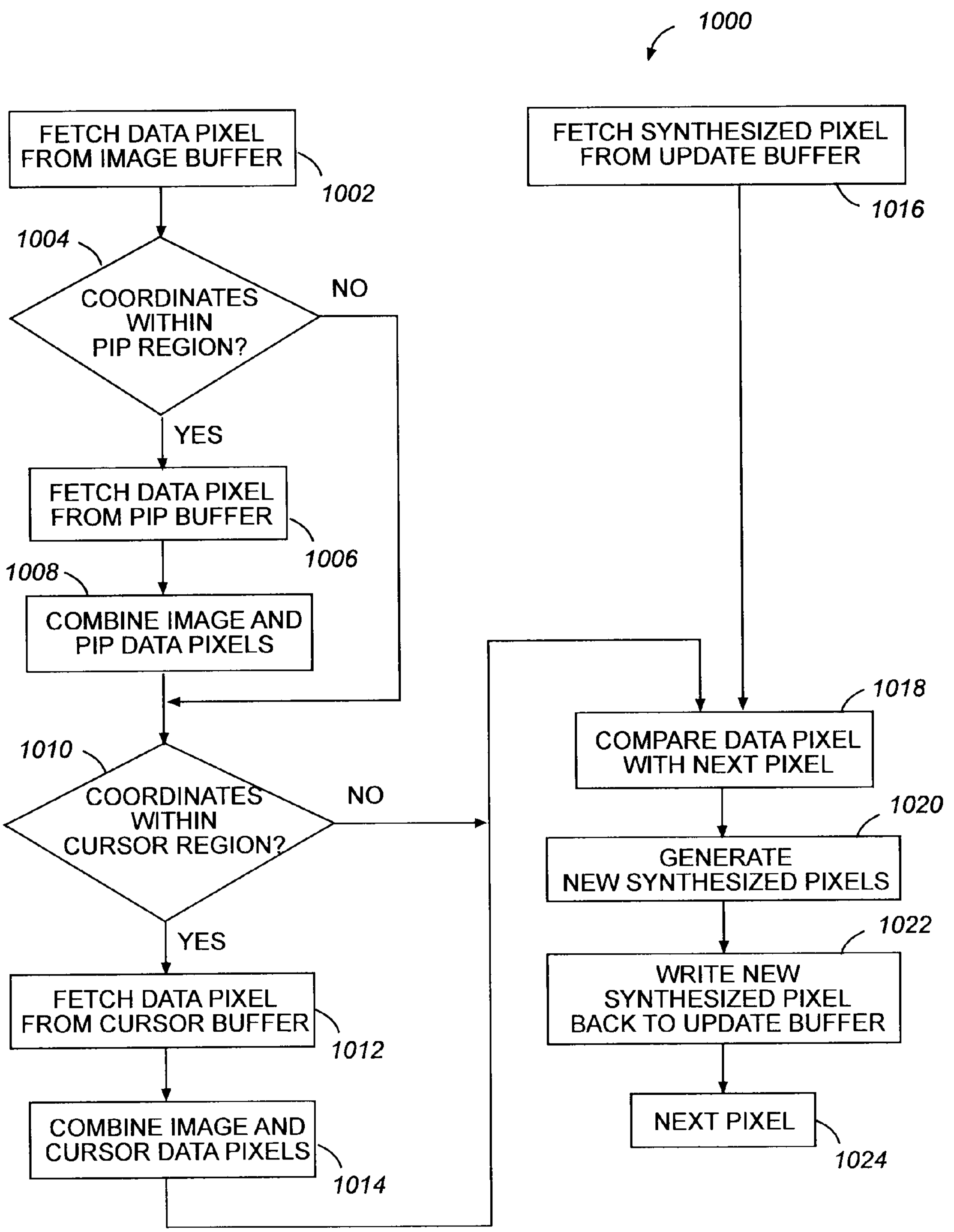
FIG. 10 is a flow diagram illustrating a pixel synthesis operation according to one embodiment.

FIG. 10 is a flow diagram illustrating a pixel synthesis operation 1000 according to one embodiment. In one embodiment, the pixel synthesis operation 1000 may be performed by the pixel processor 88. In an operation 1002, a data pixel is read or fetched from the image buffer 78. Data pixels may be read from the image buffer 78 in raster order beginning with the data pixel 40 in the upper left corner of the display matrix 26 according to one embodiment. In an operation 1016, a synthesized pixel is read or fetched from the update buffer 80. Synthesized pixels may be read from the update buffer 80 in raster order beginning with the synthesized pixel corresponding with the data pixel in the upper left corner of the display matrix 26 according to one embodiment. The operation 1002 may be performed prior to the operation 1016, the operation 1016 may be performed prior to the operation 1002, or the operations 1002 and 1016 may be performed at the same time.

In an operation 1004, the coordinate location in the display matrix 26 of the data pixel read from the image buffer 78 in operation 1002 is inspected. It is determined if the data pixel read from the image buffer 78 is inside of the PIP region in operation 1004. The coordinates of the PIP region may be read from the registers 89 as part of operation 1004. The PIP region may correspond with a first submatrix 52. If the data pixel read from the image buffer 78 is outside of the PIP region, the pixel synthesis operation 1000 may, in one embodiment, advance to operation 1010. On the other hand, if the data pixel read from the image buffer 78 is inside of the PIP region, a data pixel is read or fetched from the PIP buffer 82 in an operation 1006. The data pixel that is fetched from the PIP buffer has a coordinate location corresponding with the data pixel fetched from the image buffer 78. In an operation 1008, the respective data pixels of the image and PIP buffers may be combined to generate or produce a "derived" data pixel. The respective data pixels may be combined by selecting one data pixel or the other. The respective data pixels may be combined in an "XOR" operation. The data pixels stored in the PIP buffer may include "transparent" pixels. In one embodiment, the pixel data read from the PIP buffer may be inverted if it is not transparent and the pixel data read from the image buffer 78 may be inverted if the pixel data read from the PIP buffer is transparent. In one embodiment, the respective data pixels may be combined by selecting the data pixel from the update buffer if the corresponding data pixel from the PIP buffer is transparent, and otherwise selecting the data pixel from the PIP buffer. The pixel synthesis operation 1000 advances to operation 1010 after the operation 1008.

In operation 1010, it is determined if the data pixel read from the image buffer 78 is inside of the cursor region. The coordinates of the cursor region may be read from the registers 89 as part of operation 1010. The cursor region may correspond with a second submatrix 52. If the data pixel read from the image buffer 78 is outside of the cursor region, the pixel synthesis operation 1000 may advance to operation 1018. On the other hand, if the data pixel read from the image buffer 78 is inside of the cursor region, a data pixel is read or fetched from the cursor buffer 82 in an operation 1012. The data pixel that is fetched from the cursor buffer 82 has a coordinate location corresponding with the data pixel fetched from the image buffer 78. In an operation 1014, the respective data pixels of the image and PIP buffers may be combined to generate or produce a "derived" data pixel. The respective data pixels may be combined by selecting one data pixel or the other. The respective data pixels may be combined by calculating a combination of the two values, e.g., a weighted average. Operation 1014 is analogous to operation 1008 and any of the techniques described above with respect operation 1008 may be employed in operation 1014. However, the operations 1008 and 1014 need not employ the same combining technique. The pixel synthesis operation 1000 advances to operation 1018 after the operation 1014.

In operation 1018, a data pixel is compared with a next pixel value. The data pixel compared in operation 1018 may be the data pixel fetched in operation 1002, the data pixel resulting from the combining operation 1008, or the data pixel resulting from the combining operation 1014. The particular data pixel compared in operation 1018 depends on the results of the determinations made in operations 1004 and 1010. The next pixel value compared in operation 1018 is obtained from the synthesized pixel fetched in operation 1016. A next pixel value is included in the data structure of each synthesized pixel and represents the current display state of a corresponding display pixel. Operation 1018 compares the data pixel and the next pixel value to determine if they are equal. If the values are equal, i.e., the next and current display states are identical, then the corresponding display pixel is not marked for updating. On the other hand, if the values differ, i.e., the next and current display states differ, then the corresponding display pixel is marked for updating.

In operation 1020, a new synthesized pixel may be formed or generated. If the display pixel was not marked for updating in operation 1018, a new synthesized pixel need not be formed. If the display pixel was marked for updating, the next pixel value obtained from the fetched synthesized pixel (operation 1016) is set as the current pixel value in the new synthesized pixel. The value of the data pixel from operations 1002-1014 is set as the next pixel value in the new synthesized pixel. In operation 1022, the new synthesized pixel is written back to the update buffer 80. The operation 1022 may overwrite a previously stored synthesized pixel. As indicated by operation 1024, the pixel synthesis operation 1000 repeats operations 1002-1022 for each pixel location in the display matrix 26 according to one embodiment.

According to one alternative embodiment, the pixel synthesis operation 1000 may omit processing for the PIP region. The operations 1004-1008 may be omitted, for example, when a PIP region is not being rendered. In addition, in another embodiment, the pixel synthesis operation 1000 may omit processing for the cursor region. The operations 1010-1014 may be omitted, for example, when a cursor region is not being rendered. In addition, additional operations may be added if more than one PIP region or cursors is desired.

According to one alternative embodiment, the pixel synthesis operation 1000 may only fetch data pixels corresponding with locations within the PIP region, the cursor region, or the PIP and cursor regions. In these embodiments, operation 1002 does not fetch display pixels from the image buffer 78 in raster order. Rather, the operation 1002 may include accessing the registers 89 to determine coordinate locations of the PIP region and cursor regions. The operation fetches only data pixels from the image buffer 78 corresponding with locations within the PIP or cursor regions in one embodiment.

According to another alternative embodiment, the pixel synthesis operation 1000 may be synchronized with the fetching of synthesized pixels by the sequencer 90. The pixel processor 88 and the update pipe sequencer 90 may share synthesized pixels fetched from the update buffer 80. The update pipe sequencer 90 may fetch synthesized pixels in raster order via a splitter. The splitter may provide one copy of the fetch synthesized pixel to the pixel processor 88 and another copy to the update pipe sequencer 90. In one embodiment, the pixel processor 88 may generate a synthesized pixel for a particular location only after receiving a corresponding synthesized pixel from the splitter in lieu of the operation 1016. This embodiment is further described in co-pending application Ser. No. 12/429,593, filed on Apr. 24, 2009. The entire content of this application is hereby incorporated by reference.

Referring again to FIG. 6, the update pipe sequencer 90 may include an operability to perform one of the functions required in a display output operation. The update pipe sequencer 90 may fetch synthesized pixels from the update buffer 80 using data path D. In addition, the update pipe sequencer 90 may fetch synthesized pixels in raster order. The update pipe sequencer 90 may provide a synthesized pixel that it fetches to one of the update pipes 84. The update pipe sequencer 90 may determine which update pipe 84 to provide the synthesized pixel to by inspecting an update pipe identifier included in the synthesized pixel data structure.

In one embodiment, an update pipe 84 locates a drive scheme stored in the waveform memory 34 corresponding with a designated update mode and a current temperature. For each drive frame in the waveform period, the update pipe 84 copies all possible drive pulses for the drive scheme for the current drive frame and stores the current drive frame pulses in a lookup table associated with the update pipe. The update pipe 84 uses the current and next display states of a synthesized pixel to locate drive pulse data in the lookup table and stores the pulse data in a first-in-first-out memory ("FIFO") memory, which may be included within the update pipe. The FIFO memory is provided so that pulse data may be generated and buffered ahead of when it will be needed by the timing generation unit 86. The FIFO may be provided with one or more status flags that indicate the amount of drive pulse data present in the FIFO, e.g., full, half full, empty, etc.

The timing generation unit 86 includes an input that is coupled with the outputs of the update pipes 84. The timing generation unit 86 receives waveform data from the update pipes 84. The timing generation unit 86 provides waveform data to the display power module 38 and the display device 24 according to the timing requirements of the display device 24.

Figure 11:
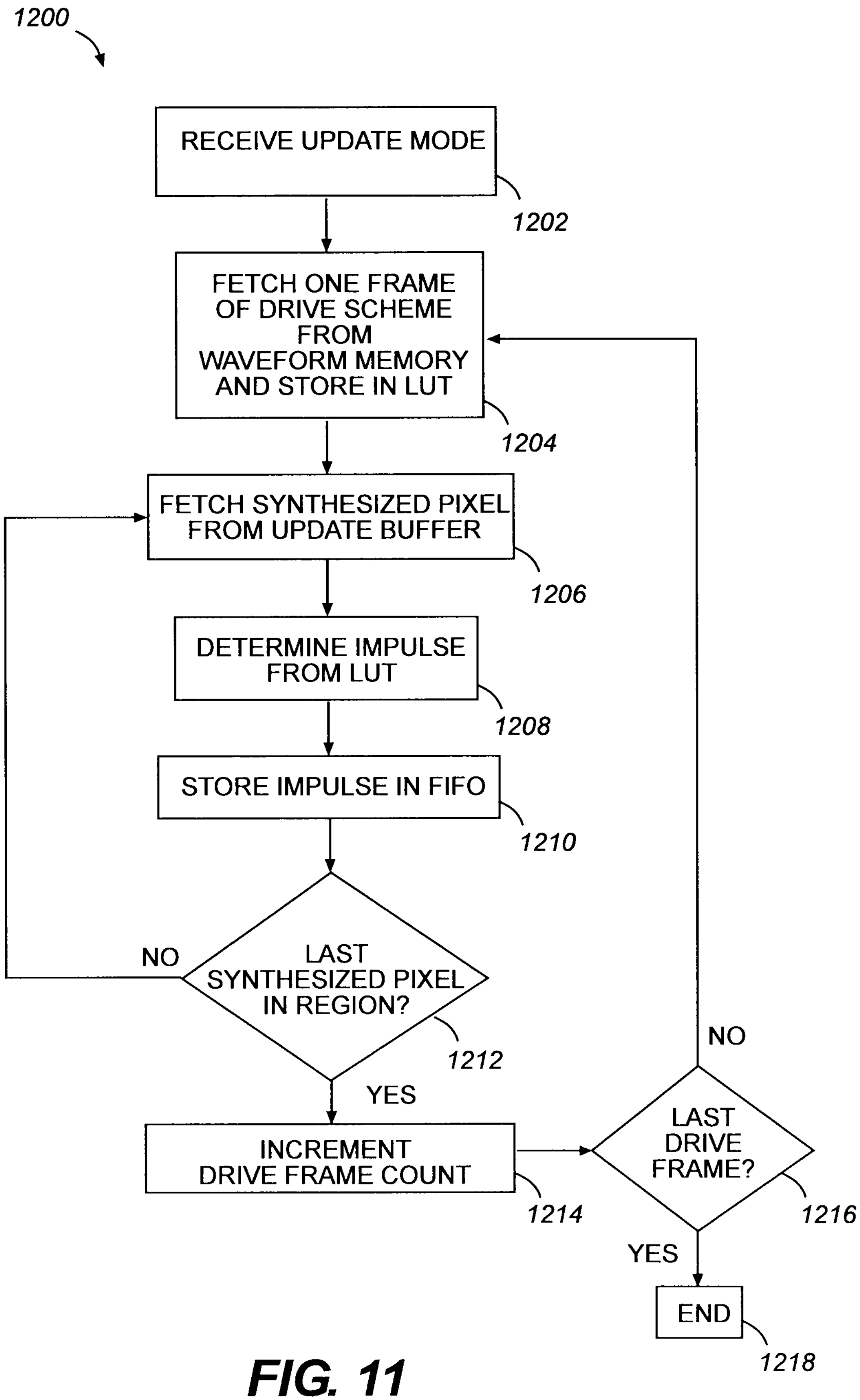
FIG. 11 is a flow diagram illustrating a display output operation according to one embodiment.

FIG. 11 is a flow diagram illustrating a display output operation according to one embodiment. In an operation 1202, an update mode or drive scheme is received. In operation 1204, one drive frame of the corresponding drive scheme from the waveform memory is fetched from the waveform memory 34. Drive pulses for the current drive frame period may be stored in a lookup table. In operation 1206, a synthesized pixel transition is fetched from the update buffer 80. All of the synthesized pixels may be fetched from the update buffer 80 in raster order for the display matrix 26. In one embodiment, synthesized pixels of a submatrix 26 may be fetched in raster order. In operation 1208, a drive impulse is determined for the synthesized pixel. The drive impulse may be determined using the lookup table. In operation 1210, the drive impulse may be stored in a FIFO memory that may be provided within an update pipe 84. In operation 1212, a determination is made if the current synthesized pixel corresponds with the last pixel location in the update region. The update region may be the display matrix 26 or the submatrix 52. If not the last pixel location, steps 1206-1210 are repeated for each additional synthesized pixel in the update region. If the current synthesized pixel is the last synthesized pixel, a drive frame count is incremented in operation 1214. In operation 1216, a determination is made whether the current drive frame is the last drive frame in the drive scheme. If not the last drive frame period, steps 1204-1210 are repeated for each drive frame period of the drive scheme.

In one embodiment, some or all of the operations and methods described in this description may be performed by executing instructions that are stored in or on a computer-readable medium. The term "computer-readable medium" may include, but is not limited to, non-volatile memories, such as EPROMs, EEPROMs, ROMs, floppy disks, hard disks, flash memory, and optical media such as CD-ROMs and DVDs.

In this description, references may be made to "one embodiment" or "an embodiment." These references mean that a particular feature, structure, or characteristic described in connection with the embodiment is included in at least one embodiment of the claimed inventions. Thus, the phrases "in one embodiment" or "an embodiment" in various places are not necessarily all referring to the same embodiment. Furthermore, particular features, structures, or characteristics may be combined in one or more embodiments.

Although embodiments have been described in some detail for purposes of clarity of understanding, it will be apparent that certain changes and modifications may be practiced within the scope of the appended claims. Accordingly, the described embodiments are to be considered as illustrative and not restrictive, and the claimed inventions are not to be limited to the details given herein, but may be modified within the scope and equivalents of the appended claims. Further, the terms and expressions which have been employed in the foregoing specification are used as terms of description and not of limitation, and there is no intention in the use of such terms and expressions to exclude equivalents of the features shown and described or portions thereof, it being recognized that the scope of the inventions are defined and limited only by the claims which follow.

What is claimed is:

1. A method, comprising:

for each of two or more pixel locations of an image rendered on a display device, selecting a first data pixel from a first image buffer if a first condition is true and selecting a second data pixel from a second image buffer if the first condition is false, the first condition being that a chosen pixel location is within a specified region of the image, said chosen pixel location being one of said two or more pixel locations;

generating a synthesized pixel from a third data pixel from a third image buffer, said third data pixel corresponding with a display state of a display pixel of the display device at said chosen pixel location and one of the selected data pixel or a data pixel derived from the selected data pixel; and updating the display pixel of the display device at the chosen pixel location with two or more drive pulses of a drive scheme corresponding with the generated synthesized pixel.

2. The method of claim 1, wherein the two or more pixel locations of the image rendered on the display device includes all of the pixel locations of the image.

3. The method of claim 1, wherein the two or more pixel locations of the image rendered on the display device includes only the pixel locations of the specified region of the image.

4. The method of claim 1, further comprising receiving at least one parameter defining the specified region of the image.

5. The method of claim 1, wherein the specified region of the image defines a cursor image.

6. The method of claim 1, wherein the specified region of the image defines an overlay image.

7. The method of claim 1, further comprising determining if a second condition is true, the second condition being that (a) the one of the selected data pixel or the data pixel derived from the selected data pixel and (b) the third data pixel corresponding with the display state of the display pixel of the display device at the chosen pixel location are different, wherein the generating of a synthesized pixel includes generating a synthesized pixel only if the second condition is true.

8. The method of claim 1, further comprising:

if the first condition is true, combining the first data pixel selected from the first image buffer for the pixel location with the second data pixel from the second image buffer for the pixel location to form the data pixel derived from the selected data pixel for the pixel location, and generating the synthesized pixel from the third data pixel corresponding with the display state of the display pixel of the display device at the pixel location and the derived data pixel.

9. The method of claim 1, wherein the updating of the display pixel of the display device at the pixel location with two or more drive pulses of a drive scheme corresponding with the generated synthesized pixel includes updating the display pixel with two or more drive pulses of a first drive scheme if the first condition is true and updating the display pixel with two or more drive pulses of a second drive scheme if the first condition is false.

10. An apparatus, comprising:

a first image buffer to store data pixels defining a first image and a second image buffer to store data pixels defining a second image;

a unit to:

select a data pixel corresponding with a chosen pixel location of a display matrix of a display device, the unit to select a first data pixel from the first image buffer if a first condition is true and to select a second data pixel from the second image buffer if the first condition is false, the first condition being that the chosen pixel location is within a display submatrix of the display matrix;

generate a synthesized pixel from a third data pixel from a third image buffer, said third data pixel corresponding with a display state of a display pixel of the display matrix at the chosen pixel location, and one of the selected data pixel or a data pixel derived from the selected data pixel; and cause the display pixel of the display matrix at the chosen pixel location to be updated with two or more drive pulses of a drive scheme corresponding with the generated synthesized pixel.

11. The apparatus of claim 10, wherein the unit selects a data pixel for each of the pixel locations of the display matrix.

12. The apparatus of claim 10, wherein the unit selects a data pixel only for pixel locations of the display submatrix.

13. The apparatus of claim 10, wherein the display submatrix defines a cursor image.

14. The apparatus of claim 10, wherein the display submatrix defines an overlay image.

15. The apparatus of claim 10, wherein the unit determines if a second condition is true and generates a synthesized pixel only if the second condition is true, the second condition being that (a) the one of the selected data pixel or a data pixel derived from the selected data pixel and (b) the third data pixel corresponding with the display state of the display pixel of the display matrix at the chosen pixel location are different.

16. The apparatus of claim 10, wherein, if the first condition is true, the unit:

combines the first data pixel selected from the first image buffer for the chosen pixel location with the second data pixel from the second image buffer for the chosen pixel location to form the data pixel derived from the selected data pixel for the location, and generates the synthesized pixel from the third data pixel corresponding with the display state of the display pixel of the display matrix at the chosen pixel location and the derived data pixel.

17. The apparatus of claim 10, wherein the unit causes the display pixel of the display matrix at the chosen pixel location to be updated with two or more drive pulses of a first drive scheme if the first condition is true and with two or more drive pulses of a second drive scheme if the first condition is false.

18. The apparatus of claim 10, further comprising an update buffer to store synthesized pixels.

19. An apparatus, comprising:

an electrophoretic display device;

a first image buffer to store data pixels defining a first image, a second image buffer to store data pixels defining a second image, and an update buffer to store synthesized pixels; and a unit to:

select a data pixel corresponding with a chosen pixel location of a display matrix of the display device, the unit to select a first data pixel from the first image buffer if a first condition is true and to select a second data pixel from the second image buffer if the first condition is false, the first condition being that the chosen pixel location is within a defined display submatrix of the display matrix, generate a synthesized pixel from a third data pixel from the update buffer, said third data pixel corresponding with a display state of a display pixel of the display matrix at the chosen pixel location and one of the selected data pixel or a data pixel derived from the selected data pixel, and cause the display pixel of the display matrix at the chosen pixel location to be updated with two or more drive pulses of one of at least two drive schemes corresponding with the generated synthesized pixel.

20. The apparatus of claim 19, wherein the unit causes the display pixel of the display device at the chosen pixel location to be updated with two or more drive pulses of a first drive scheme if the first condition is true and with two or more drive pulses of a second drive scheme if the first condition is false, and wherein the unit causes one or more display pixels within the display submatrix and one or more display pixels outside of the display submatrix to be updated in separate operations that overlap in time.

* * * * *